Oct. 3, 1967 — A. R. HARM — 3,344,577
APPARATUS AND METHOD FOR MAKING PACKAGES FOR CYLINDRICAL OBJECTS
Filed March 23, 1964 — 3 Sheets-Sheet 1

INVENTOR.
Alson R. Harm
BY Fredrik H. Braun
ATTORNEY

Oct. 3, 1967

A. R. HARM 3,344,577

APPARATUS AND METHOD FOR MAKING PACKAGES
FOR CYLINDRICAL OBJECTS

Filed March 23, 1964

INVENTOR.
Alson R. Harm

BY *Fredrick H Braun*

ATTORNEY

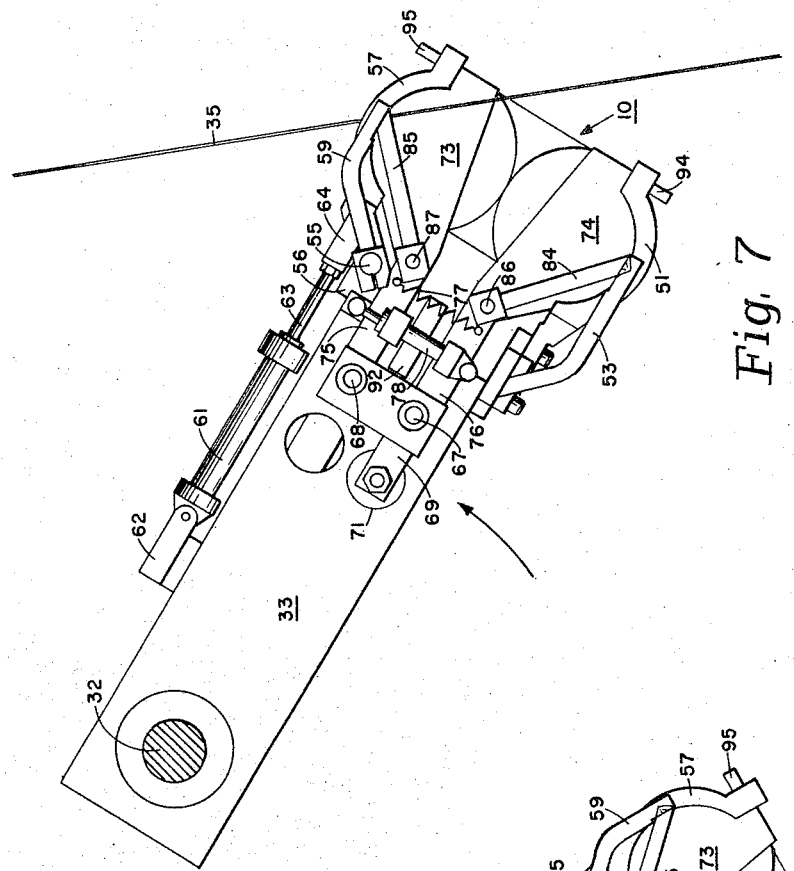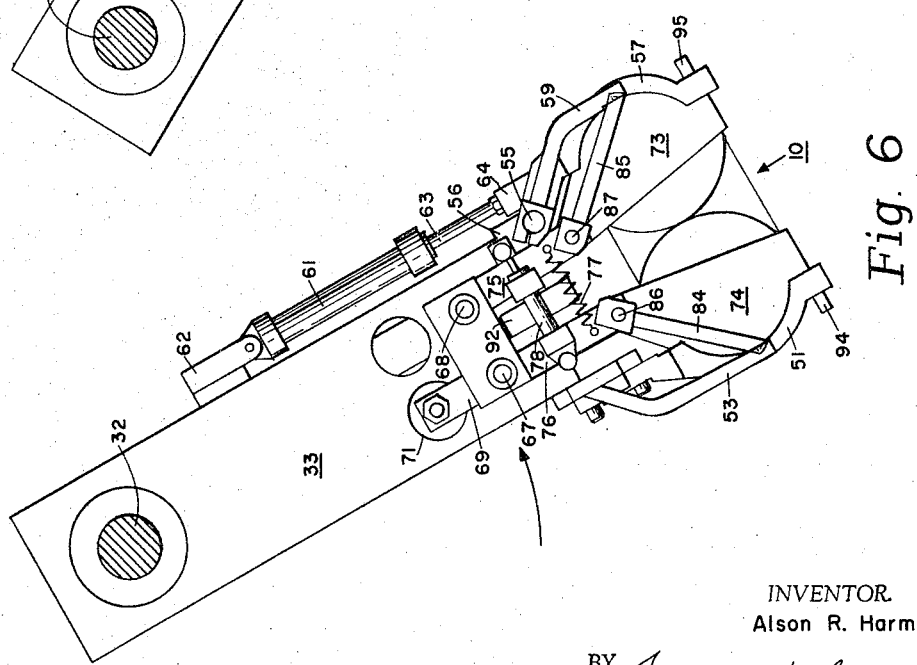

United States Patent Office 3,344,577
Patented Oct. 3, 1967

3,344,577
APPARATUS AND METHOD FOR MAKING PACKAGES FOR CYLINDRICAL OBJECTS
Alson R. Harm, Springfield Township, Hamilton County, Ohio, assignor to The Procter & Gamble Company, Cincinnati, Ohio, a corporation of Ohio
Filed Mar. 23, 1964, Ser. No. 353,856
4 Claims. (Cl. 53—39)

This invention relates to an improvement in packages including an apparatus and method for making the package. More particularly, the invention is broadly directed to the packaging of cylindrical objects in which the objects are overwrapped with a heat-sealable film and an apparatus and method for removing excess packaging material from the overwrap in order to form an attractive package with smooth undistorted surfaces.

In the packaging of cylindrical products such as toilet tissue rolls, hand towel rolls and similarly shaped objects, it is a common practice to market the product in a package containing two or more such products to simulate multiple sales. Products of this kind are ofttimes packaged in flexible thermoplastic films which may be transparent so that a potential consumer can see the product at the time of making a purchase. When forming a flexible thermoplastic film around a plurality of cylindrical products, the geometry of the products causes the formation of a package in which a certain amount of excess material remains after the film has been seamed to completely enclose the product. This excess material is usually folded or tucked so that it will detract as little as possible from the appearance of the finished package. Nevertheless, no matter how the excess material is folded or tucked, it still tends to detract from the appearance of the package to some extent. More particularly, it diminishes the unobstructed area remaining on the surface of the package for the printing of trade marks, advertising copy and the like.

It is an object of this invention to provide an attractive package for cylindrical products in which the products are neatly and snugly packaged in a film of heat-sealable thermoplastic material with all of the excess packaging material entirely eliminated.

Another object of the invention is the formation of a package of the above character wherein all of the surfaces of the package have maximum areas which remain unobstructed to make them available for the printing of advertising or like matter.

Still another object of the invention is the provision of an apparatus and method for removing the excess packaging material from a sealed package containing a plurality of cylindrical products, said package being formed from a heat-sealable, thermoplastic material.

A further object of the invention is the provision of an apparatus and method which is capable of removing excess packaging material efficiently at high speeds in a continuous operation so that it will be practical for adaptation to commercial usage.

The nature and substance of the invention can be briefly summarized as the provision of a package for a plurality of cylindrical articles having their axes in parallel relation and their ends in parallel planar relation wherein the articles are encased in an elongated tube formed from a web of thermoplastic, heat-sealable material. The packaging material is seamed at the ends of the package in close relation to the cylindrical surfaces of the packaged articles so that the articles are firmly retained with the finished package. An excess of packaging material projects outwardly from the parallel planar surfaces at the curved ends of the package after the articles are encased due to the geometry of the packaged articles. The excess packaging material is severed along a line adjoining the intersection of the cylindrical surfaces of the articles and their planar ends to form a seam which corresponds substantially with the curvature of the cylindrical articles at the ends of the finished package.

Another aspect of the invention involves an apparatus and method for removing the previously mentioned excess packaging material. The apparatus and method contemplates the use of a revolving turret member rotated in timed relation to an infeed conveyor and provided with means for picking up and carrying a package having excess material at its ends. The turret member is provided with movable jaws and clamps which initially are moved inwardly against the parallel planar surfaces of the package and are thereafter pivoted outwardly to engage and clamp the excess material extending from both sides and at either end of the package. The turret member is revolved past cutting members in the form of hot wires which are mounted to sever material alongside the movable jaws thus forming a seam as the turret arm is continuously rotated. After the excess packaging material has been removed, the turret arm deposits the finished package on a take-away conveyor from where it is moved to another station for further handling.

While the specification concludes with claims particularly pointing out and distinctly claiming the subject matter regarded as forming the present invention, it is believed the invention will be better understood from the following description taken in connection with the accompanying drawings in which:

FIGURE 6 is a side elevation showing the turret arm and the relative position of the parts thereof after a package is picked up and clamped prior to the removal of the excess material.

FIGURE 7 is an elevation showing the turret arm rotated beyond the position of FIGURE 6 to a point where the hot wires are severing the excess material and forming the curved end seams.

The invention will be described herein for packaging rolls of toilet tissue paper. This is done purely for convenience as it will be evident that any cylindrical articles can be packaged as described hereinafter. Furthermore, while in the exemplary embodiment the invention is described for packaging two rolls of toilet tissue paper, it will be understood that three rolls or other articles or any number of rolls or other articles can be packaged and that the number of articles in the package is not to be construed as placing a limitation on the scope of the invention.

Figure 1:
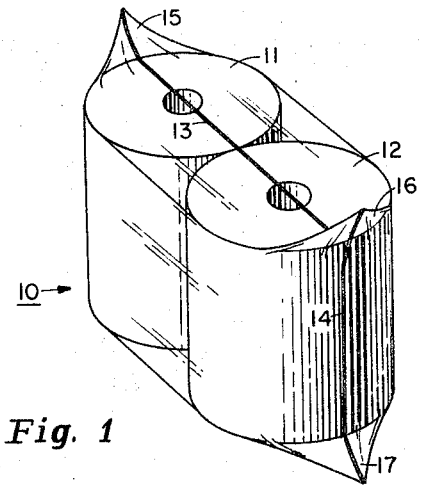
FIGURE 1 is an isometric view of a package made of transparent thermoplastic material enclosing two rolls of toilet tissue paper showing the extending excess material at both ends prior to its removal.

Referring now to FIGURE 1, the package illustrated generally by the reference numeral 10 is made by forming, folding and sealing a web of thermoplastic heat-sealable material such as polyethylene or the like around the rolls of toilet tissue paper 11 and 12 such that the rolls 11 and 12 have substantially parallel axes. The package has a longitudinal heat seal formed at 13 after the wrapping material has been folded around the toilet tissue rolls 11 and 12. Thereafter, a transverse heat seal 14 is made at one end and a similar end seal (not shown) is formed at the opposite end to completely enclose the rolls of toilet tissue 11 and 12. The formation of the package to this point can be accomplished on conventional commercial equipment such as a Campbell model 2W10–P wrapping machine as manufactured by the Hudson Sharp Division of the FMC Corporation.

It will be noted, however, that when the package is completed to this stage, it has an excess of material in the form of ears 15, 16 and 17 (as well as a fourth ear at the end opposite the ear 17 which does not show in FIGURE 1) which project upwardly and outwardly at the intersection of the curved surfaces of the package with the planar surfaces. A completed package is generally illustrated by the reference numeral 18 in FIGURE 2. It will be noted that the aforesaid ears consisting of excess material have been removed. This is accomplished, with respect to the ear 16, for example, by simultaneously severing and forming a heat seal between the points 19 and 20 on the curved line 21 at which the cylindrical surface of the package joins the planar surface at one end. The ears 15 and 16 of the package 10 are similarly removed by the formation of the seams 22 and 23. The ear (not shown) at the bottom opposite the ear 17 is also removed in similar fashion.

Figure 3:
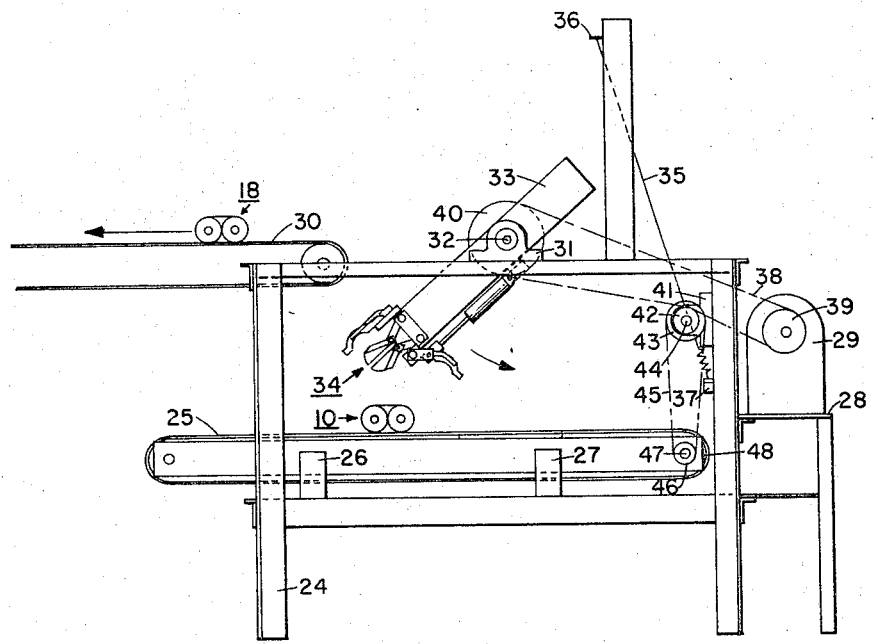
FIGURE 3 is a side elevation of an apparatus that can be used to remove the excess packaging material by the method herein described.

The general structure of an apparatus for carrying out a method of forming the package 18 from the package 10 is illustrated in FIGURE 3. The apparatus includes a frame 24 which supports an infeed conveyor 25 by means of the brackets 26 and 27. A support 28 is provided to mount a motive power source 29. A take-away conveyor 30 is mounted as illustrated at the upper portion of the apparatus to receive the completed packages 18. A bearing 31 is mounted on the frame 24 and a similar bearing (not shown) is mounted in spaced relation on the frame 24 aligned with the bearing 31. A turret shaft 32 is mounted for free rotation in the bearing 31 on one side of the frame and in the similar bearing (not shown) on the other side. A turret arm 33 is keyed to the turret shaft 32 and has the clamping mechanism indicated generally at 34 at one end. The details of the clamping mechanism 34 will be described more fully hereinafter. A hot cut-off wire 35 is secured to insulators 36 and 37. A similar hot cut-off wire (not shown) is provided on the other side of the apparatus in alignment with the wire 35.

The motive power source 29 rotates the turret shaft 32 at substantially constant speed by means of the chain 38 and the sprockets 39 and 40. A bearing block 41 mounted on the frame has a sprocket 42 freely rotatable on a shaft 44 extending through the bearing block 41. The sprocket 42 is engaged by the chain 38. A sprocket 43 is mounted on the other end of the shaft 44 to drive the chain 45 which turns the sprocket 46 secured to the shaft 47 which drives the pulley 48 to move the infeed conveyor 25 in timed relation to the rotation of the turret arm 33.

In this embodiment, a single turret arm 33 is described merely for the sake of simplicity. It should be understood that in practice a multiplicity of turret arms would be mounted to extend radially in a common plane from the turret shaft 32 so that closely spaced packages moving forward on the conveyor 25 could be picked up and finished at high production rates.

Figure 4:
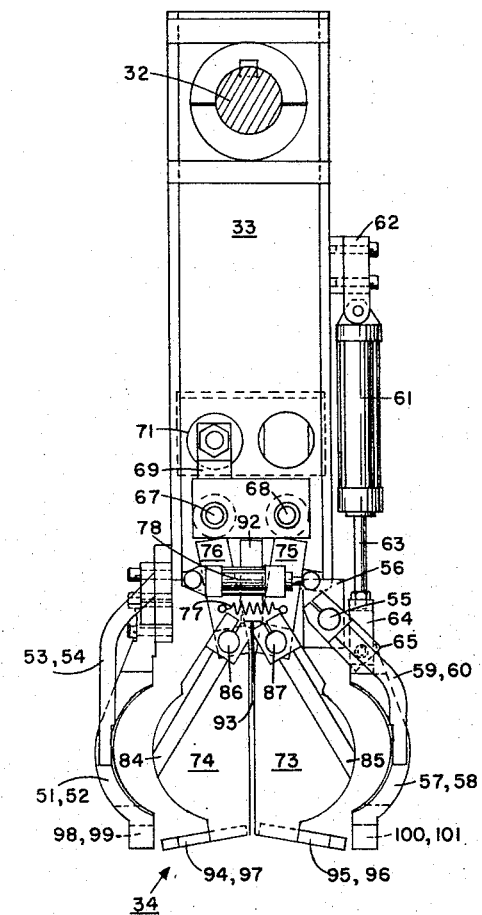
FIGURE 4 is a detailed side elevation of the turret arm used to hold and carry the packages in the removal of the excess material.
Figure 5:
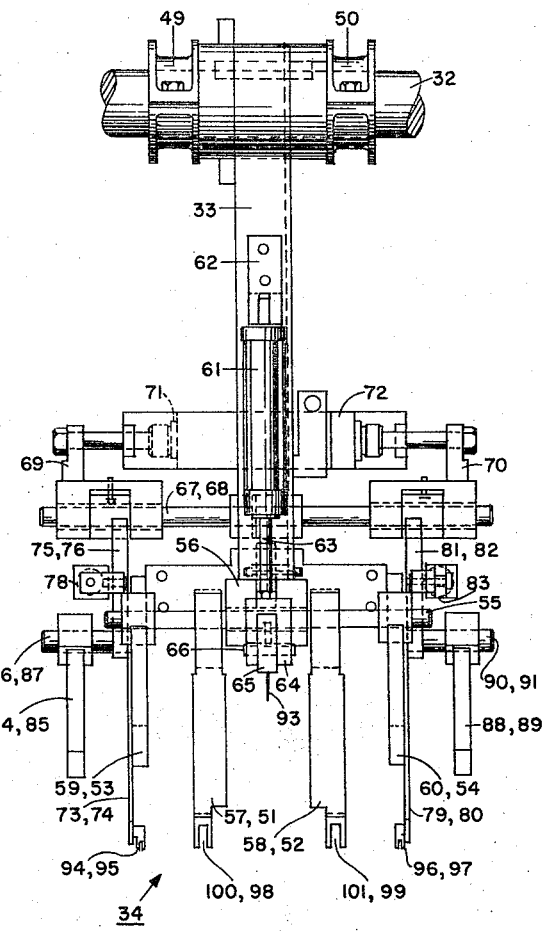
FIGURE 5 is a detailed end elevation of the turret arm as described in connection with FIGURE 4.

The details of the clamping mechanism 34 at the lower end of the turret arm 33 will now be described with reference to FIGURES 4 and 5. As previously indicated, the turret arm 33 is keyed to the turret shaft 32. It is restrained from lateral movement by the split collars 49 and 50. The lower end of the turret arm 33 has stationary jaws 51 and 52 which are in alignment as illustrated in FIGURE 4 so that only the jaw 51 can be seen. Stationary ear jaws 53 and 54 are also attached in spaced relationship on the same side as the stationary jaws 51 and 52 and, again, only the jaw 53 is visible in FIGURE 4. The spacing of the jaws 51, 52 and 53, 54 all of which are stationary with respect to the turret arm 33 will be clarified in the explanation which follows.

A clamping jaw shaft 55 is mounted for rotational movement in the bracket 56. Clamping jaws 57 and 58 are attached to the shaft 55 and ear clamping jaws 59 and 60 are also attached to the shaft 55. In viewing FIGURE 5, the stationary jaws 51 and 52 are in alignment with the clamping jaws 57 and 58, respectively, and the ear jaws 53 and 54 are in alignment with the ear clamping jaws 59 and 60, respectively. The jaws 57 and 58 are rotated by the shaft 55 to clamp a package 10. Rotation is caused by means of an air cylinder 61 secured at one end to the mounting bracket 62 and having its protruding rod 63 attached to the clevis 64 which actuates the lever 65 by means of the pin 66. The other end of the lever 65 is attached to the shaft 55.

When the turret arm is in package receiving position, the rod 63 is drawn into the air cylinder 61 so that the jaws 57, 58, 59 and 60 are pivoted to a position approximately as shown in FIGURE 3. After the package is contacted by the stationary jaws 51 and 52, the air cylinder 61 is actuated forcing the jaws 57, 58, 59 and 60 to pivot downwardly and clamp the package 10 so that it is held at the end of the turret arm 33 between the jaws 51, 52 and 57, 58.

The clamping mechanism 34 also includes means for holding the ears 15, 16, 16 and the fourth ear (not shown in FIGURE 1) so that they can be cleanly severed while simultaneously forming a seam in the package material at each line of severance. This mechanism includes a pair of slide shafts 67 and 68 (FIGURE 4) which extend laterally outwardly on either side of the arm 33. As shown in FIGURE 5, an expanding jaw slide 69 is mounted on one side of the arm 33 for sliding movement on the shafts 67 and 68. Similarly, an expanding jaw slide 70 is mounted on the other side for movement on the shafts 67 and 68. The air cylinder 71 is secured to the arm 33 and controls the inward and outward movement of the slide 69 and the air cylinder 72 similarly controls the movement of the slide 70.

Expanding jaw plates 73 and 74 are respectively joined to the arms 75 and 76 which in turn are mounted for rotational movement on the shafts 68 and 67, respectively. A spring 77 is mounted on the arms 75 and 76 to normally hold them in the position shown in FIGURE 4. An air cylinder 78 has its ends secured to the arms 76 and 75 to force them outwardly when the air cylinder 78 is actuated at the appropriate time in the cycle. In similar fashion, expanding jaw plates 79 and 80 are provided on the other side of the turret arm 33 as illustrated in FIGURE 5. These are provided respectively with arms 81 and 82 which pivot on the shafts 68 and 67, respectively. An air cylinder 83 is provided to serve the same function as air cylinder 78 used to move the jaw plates 73 and 74. The details of the expanding jaw plates 79 and 80, the arms 81 and 82 as well as the air cylinder 83 are not clearly visible in FIGURE 5. It will be understood, however, that these elements correspond, respectively, to the jaw plates 73 and 74, the arms 75 and 76 and the air cylinder 78 as shown in FIGURE 4.

As shown in FIGURE 4, ear clamps 84 and 85 are attached to the studs 86 and 87, respectively, which project from the arms 76 and 75, respectively. Similarly, ear clamps 88 and 89 are provided on the far side (FIGURE 5) and are secured to the studs 90 and 91.

If desired, a small air cylinder 92 (FIGURE 4) having a hypodermic needle 93 at its lower end can be provided for the purpose of puncturing the thermoplastic film which forms the package. The purpose of this is to inflate the package so that the ears will have some rigidity thus making it easier to clamp them in place for severing.

In operation, the packages 10 are delivered in spaced relation on the infeed conveyor 25 where they are fed forward until their rear curved surface is engaged by the stationary jaws 51 and 52 of the turret arm 33. The air cylinder 61 is then actuated pivoting the clamping jaws 57 and 58 into closed position so that the package 10 is held firmly by the turret arm. Subsequently, the air cylinders 71 and 72 are actuated causing the slides 69 and 70 to move inwardly toward the turret arm 33 thereby moving the jaw plates 73, 74, and 79, 80 inwardly until their projections 94, 95, 96 and 97 are aligned with the slots 98, 99, 100 and 101 in the jaws 51, 52 and 57, 58.

The air cylinders 78 and 83 are then actuated to move the jaw plates 73, 74 and 79, 80 outwardly so that their edge portions engage and clamp the lower portion of each ear extending from the package 10 against the jaws 51, 52 and 57, 58. Alignment of the jaw plates 73, 74 and 79, 80 is maintained by the engagement of the projections 94–97 with the respective slots 98–101 (see FIGURE 6). Simultaneously with the movement of the jaw plates 73, 74 and 79, 80 the ear clamps 84, 85 and 88, 89 also move outwardly to clamp the tip of each ear against the ear jaws 53, 54 and 59, 60. This completes clamping of the ears of the package 10 in the clamping mechanism 34. The position of the parts in the fully clamped position is illustrated in FIGURE 6 which shows the turret arm as it is moved beyond the pick-up station.

As the turret arm 33 continues to rotate, the hot cut-off wire 35 (as shown in FIGURES 1 and 7) severs the ears by movement in contacting relation to the jaw plates 73 and 74 on one side. It will be understood that the similar hot wire (not shown) which is aligned with the hot wire 35, simultaneously severs the ears on the other side of the package by moving in contacting relation to the jaw plates 79 and 80.

Figure 2:
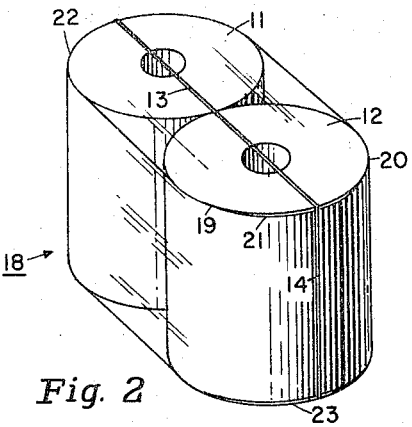
FIGURE 2 is an isometric view similar to FIGURE 1 showing the completed package after the excess material at the ends thereof has been removed.

In the course of passing the hot wires, the package is completed since the curved seams 21, 22, 23, etc. are formed so that the package is in the finished form shown in FIGURE 2. On further movement of the turret arm 33, the air cylinders 78 and 83 are released so that the spring 77 will restore the jaw plates 73 and 74 to their original position and a similar spring (not shown) will restore the jaw plates 79 and 80 to their original position. The air cylinders 71 and 72 move the slides 69 and 70 outwardly thus returning the clamping mechanism 34 to the position it assumed prior to the clamping of the ears. The air cylinder 61 is then actuated to withdraw the clamping jaws 57 and 58 as the arm 33 approaches the take-away conveyor 30 to permit the finished package to be deposited thereon. The arm 33 continues to rotate and picks up the next package 10 from the infeed conveyor 25 to carry it through the ear severing cycle.

The circuitry and the pneumatic system for operating the apparatus and the various air cylinders are conventional and are not described in any detail herein. It will occur to the skilled worker that various forms of mechanical, pneumatic, hydraulic or electrical actuating devices for the various operating components of the apparatus may be provided. It will also be evident that the actuating or operating circuits for these components will vary accordingly. However, with these teachings as a guide, the necessary circuit means for carrying out the objectives of the invention will be readily apparent to the skilled worker in the art.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A method for removing excess material in the form of ears from a package containing cylindrical articles wherein said package is overwrapped with a heat-sealable, thermoplastic film comprising the steps of holding said package so that its ears protrude outwardly, severing said ears and forming a seam at the line of severance at the juncture of the curved end surfaces of the package with the planar surfaces of the package which lie substantially perpendicular to the axes of the articles.

2. Apparatus for removing excess material in the form of ears from a package containing cylindrical articles wherein said package is overwrapped with a heat-sealable, thermoplastic film comprising the combination of a frame, a rotating turret arm mounted on said frame, means for grasping and holding the package at the end of the turret arm, means for clamping the ears at the end of the turret arm, hot wire cut-off means mounted on said frame, said turret arm moving past said hot wire cut-off means to sever said ears and simultaneously form a seam in the wrapping material at the juncture of the curved end surfaces of the package with the planar surfaces of the package which lie substantially perpendicular to the axes of the articles.

3. Apparatus as claimed in claim 2 including means for laterally moving the ear clamping means into engagement with the planar surfaces of the package which are substantially perpendicular to the axes of the articles prior to actuating the ear clamping means.

4. Apparatus as claimed in claim 3 including means for puncturing the package film and means for injecting a gaseous fluid medium into said package to make said ears partially rigid before clamping and severing same.

References Cited

UNITED STATES PATENTS 2,726,706  12/1955  Hakomaki _____ 156—515
3,150,573  9/1964  Piazze _____ 229—53

EARL M. BERGERT, *Primary Examiner.*

DOUGLAS J. DRUMMOND, *Examiner.*